(12) United States Patent
Ahmed et al.

(10) Patent No.: US 8,280,351 B1
(45) Date of Patent: Oct. 2, 2012

(54) AUTOMATIC DEVICE AUTHENTICATION AND ACCOUNT IDENTIFICATION WITHOUT USER INPUT WHEN APPLICATION IS STARTED ON MOBILE STATION

(75) Inventors: Shahid Ahmed, Monmouth Junction, NJ (US); Venkat Gaddam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 204 days.

(21) Appl. No.: 12/700,234

(22) Filed: Feb. 4, 2010

(51) Int. Cl.
*H04M 1/66* (2006.01)

(52) U.S. Cl. ........ 455/411; 455/410; 455/433; 380/229; 380/231; 380/239; 380/247; 726/2; 726/9; 726/20; 726/21

(58) Field of Classification Search .................... None
See application file for complete search history.

(56) References Cited

U.S. PATENT DOCUMENTS

| | | | |
|---|---|---|---|
| 6,895,439 B2 | 5/2005 | Isomaki et al. | |
| 7,954,141 B2* | 5/2011 | De Lutiis et al. | 726/9 |
| 7,995,994 B2* | 8/2011 | Khetawat et al. | 455/410 |
| 2003/0012382 A1 | 1/2003 | Ferchichi et al. | |
| 2003/0035408 A1 | 2/2003 | Hebert | |
| 2003/0039237 A1 | 2/2003 | Forslow | |
| 2003/0120593 A1 | 6/2003 | Bansal et al. | |
| 2003/0152232 A1 | 8/2003 | Pirila et al. | |
| 2003/0159068 A1 | 8/2003 | Halpin et al. | |
| 2003/0163733 A1* | 8/2003 | Barriga-Caceres et al. | 713/201 |
| 2003/0193733 A1 | 10/2003 | Hakamata et al. | |
| 2004/0088186 A1 | 5/2004 | Anvekar et al. | |
| 2004/0225878 A1 | 11/2004 | Costa-Requena et al. | |
| 2005/0059397 A1 | 3/2005 | Zhao | |
| 2005/0060363 A1 | 3/2005 | Jang et al. | |
| 2005/0078824 A1* | 4/2005 | Malinen et al. | 380/247 |
| 2005/0096048 A1 | 5/2005 | Clare et al. | |
| 2005/0102529 A1 | 5/2005 | Buddhikot et al. | |
| 2005/0113067 A1 | 5/2005 | Marcovici et al. | |
| 2005/0120221 A1 | 6/2005 | Arnold et al. | |
| 2008/0127320 A1* | 5/2008 | De Lutiis et al. | 726/9 |
| 2009/0191844 A1* | 7/2009 | Morgan et al. | 455/411 |
| 2010/0014661 A1* | 1/2010 | Terekhova et al. | 380/42 |

* cited by examiner

*Primary Examiner* — Wayne Cai

(57) ABSTRACT

Disclosed procedures automatically identify a carrier-authorized mobile station and verify an account related identifier (e.g. mobile number) associated with the device, in response to start-up of an application in the device. In an example, application start-up causes the device to send a request to an application server, with the device's current IP address, MTN and a device identifier such as MEID or ESN. The server queries a AAA system of the network to retrieve the MTN that has been assigned the IP address. If the retrieved MTN matches the MTN passed to the server in the request, the server queries a network database such as DMD for the device identifier associated with the MTN. A match of the device identifier retrieved from the network database with that passed to the server via the request indicates perfect authenticity of the requesting device and its MTN.

10 Claims, 4 Drawing Sheets

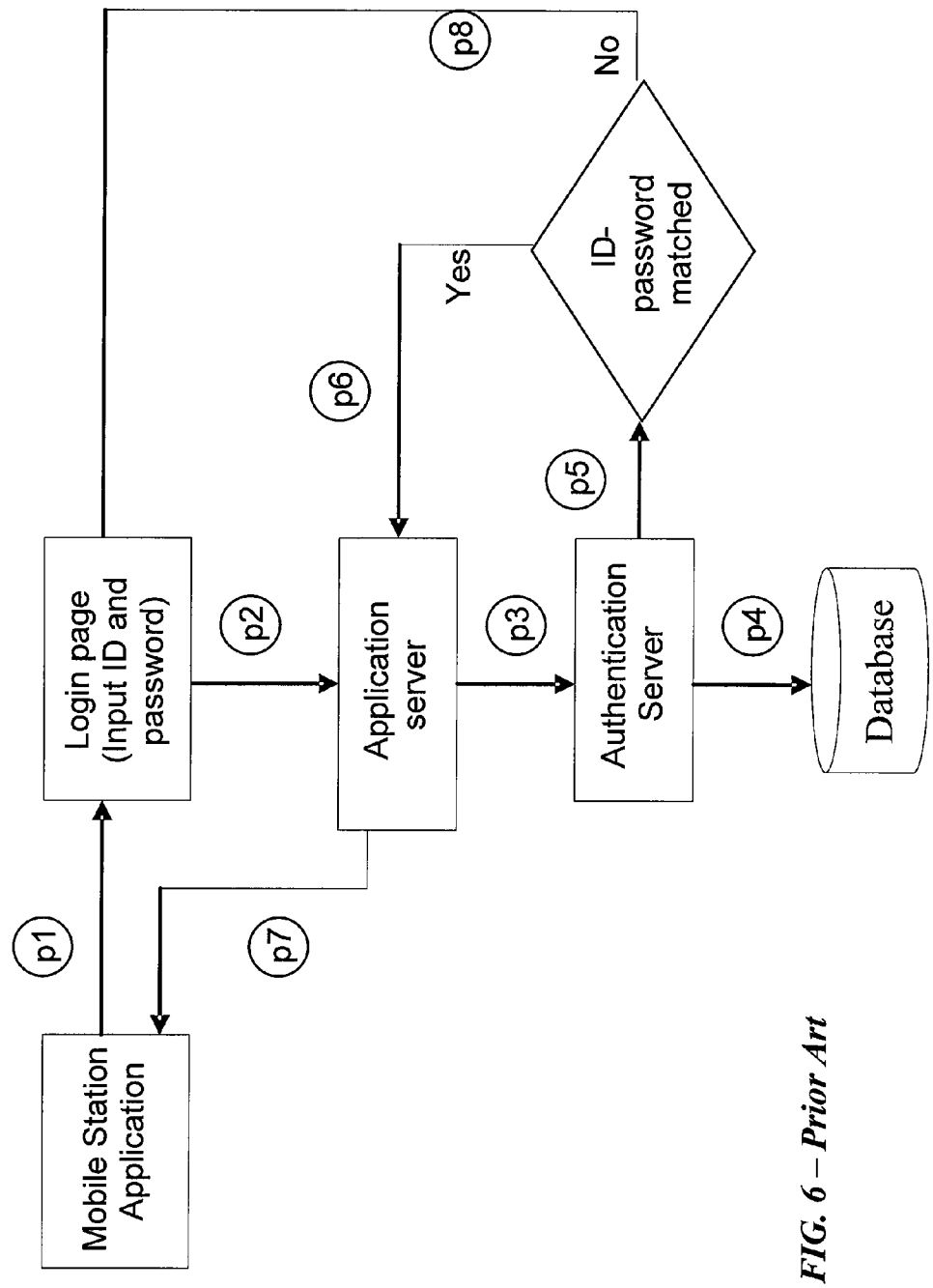
*FIG. 6 – Prior Art*

AUTOMATIC DEVICE AUTHENTICATION AND ACCOUNT IDENTIFICATION WITHOUT USER INPUT WHEN APPLICATION IS STARTED ON MOBILE STATION

TECHNICAL FIELD

The present subject matter relates to technologies to automatically authenticate a carrier-authorized mobile device in response to start-up of an application in the device and to automatically verify an account identifier such as a mobile number associated with the device, while requiring no user input on the mobile device for user authentication at application start-up.

BACKGROUND

In recent years, mobile stations have become "must have" devices for most people, in many countries. The communications that such devices offer, via wireless mobile communications network, enable users to talk and exchange various types of messages for business and personal reasons and to access information, all from or while traveling through any location where a network provides compatible wireless communication service.

In support of these activities, mobile stations run many applications for their users, which need to display and process device-specific or account-specific information stored in servers which are customer-proprietary and privacy-sensitive. If a device application needs to retrieve customer data from a server through the carrier network and process or display the data on the mobile station, device authentication and user identification must be done first.

The system must ensure that the device belongs to a valid account and the account was authorized to use data connectivity of the wireless carrier. This involves both device authentication and account identification. Hence, when a server receives a request from such an application, the first thing it needs to do is to authenticate the device, that is to say, determine that the device belongs to a valid and active account. Once this device authentication is done, correct identification of the account is the next step. Typically, the system must determine the correct mobile telephone number (or account) of the mobile device. Only then it will be able to pull device-specific information from the databases of carrier network and send it to handset for further processing.

A common practice is to challenge users for a user login identifier (ID) and a password. However, this approach is not optimal in the context of mobile station applications. The flowchart of FIG. 6 represents an outline of the events that usually take place during the start of a typical mobile application that mimics traditional web paradigm, with User ID/Password challenge.

At step p1, the customer starts the mobile device-resident mobile station application that will access a network database to retrieve and/or process customer-specific data. In order to do user identification and authentication, a login page is displayed prompting the user for User ID and Password. In step p2, as the user submits the login page containing ID and Password, and the application causes the mobile station to send the ID and Password information to the application server.

Next (step p3), the application server sends the login information to an authentication server. The authentication server could be a separate physical server or another module of the server application. In step p4, the authentication server queries a network database for user-entered ID-Password combination. At step p5, the authentication server matches the query result, to determine if the user-entered ID-Password combination matches those of a valid mobile station account. If a match is found, at step p6, then the authentication server sends the identity information of the user to the application server.

At step p7, the application server uses the identity information to retrieve appropriate customer data from the system and sends the retrieved customer data to the application running in the mobile station. The application server also establishes a session through the network with the application running on the mobile station. As long as the session continues, the identity information is used whenever needed.

However, if a match was not found, at step p8, the user is redirected to the login page. The cycle may repeat/continue until a valid ID-password combination is submitted.

This method may work fine in the traditional web paradigm where the user accesses an application using a personal computer (PC), but it poses a huge security risk and significant user inconvenience when applied to mobile devices.

For most of the relevant mobile applications, security is a critical concern to the service provider. When a mobile user launches an application that interacts with servers, the carrier must ensure that the requesting device is an authorized one, because the carrier cannot allow unauthorized devices to access its network or its sensitive/valuable information. Also, the carrier needs to ensure the device was provisioned for data usage, e.g. to avoid fraudulent access to paid subscription services. In other words, the account (the device belongs to) must have a valid data plan and is allowed to use the data network. To use the data network, specific features must be provisioned for a carrier-authorized device. Before allowing data traffic from that particular device to go through carrier's network, the system needs to make sure the device had proper allowance. However, unauthorized users can sometimes spoof the User ID and Password entries, compromising the service with regard to these security concerns.

User experience also presents concerns. Many mobile devices today do not have a full keyboard or data entry pad. Typing accurately on a mobile device having a limited keypad is not an easy task, for many average users. Entering data against the User ID/Password challenge may be difficult and frustrating. The requirement for user inputs for authentication therefore significantly impacts the user experience. Mobile users always prefer systems that require minimum user inputs or keystrokes.

For at least the reasons outlined above, mobile applications need a transparent device authentication and user account identification mechanism that requires little or no user input.

SUMMARY

The teachings herein provide improvement in authentication and/or identification, when an application for a particular service is started on a mobile station. The inventors have recognized that since mobile devices are completely personalized and the carrier has the capability to identify devices transparently, it would be desirable to leverage the network capabilities to provide a more favorable user-experience that offers automatic authentication and account identification, typically without user input of a User ID/Password combination or the like. A number of improved methods are discussed in the disclosure, by way of examples.

For example, one or more servers or the like might implement a method of authorizing mobile access to an application service. The application service relates to an application started on the mobile station. The method involves receiving a request for the application service from the mobile station, via a data session for the mobile station previously established through a mobile communication network. The received request includes a network address assigned to the mobile station for the established data session, a number associated with an account of the mobile station for communications of the mobile station through the mobile communication network and a device specific identifier of the mobile station. However, the request does not include any user input at the mobile station regarding user authorization for the application service. The server oriented method also involves sending a query containing the network address assigned to the mobile station for the established data session, to an authentication element of the mobile communication network and sending another query containing the number to a database of the mobile communication network. A response from the authentication element contains an account associated number to which the network address has been assigned, and a response from the database contains a device specific identifier associated with the number from the request received from the mobile station. A server authorizes the mobile station to access the application service if two conditions are satisfied: (1) the number contained in the request from the mobile station matches the account associated number received in the response from the authentication element, and (2) the device specific identifier contained in the request received from the mobile station matches the device specific identifier contained in the response from the database.

By way of another example, the detailed description and drawings disclose a method somewhat more oriented to the mobile station perspective, for automatically obtaining access to an application service. Upon activation of an application for execution on a mobile station, a processor or the like of the mobile station automatically accesses resources within the mobile station to obtain a number associated with an account of the mobile station for communications of the mobile station through the network and a device specific identifier of the mobile station. However, there need be no input of a user identifier or password or the like. A request for the application service is sent from the mobile station via a data session for the mobile station previously established through a mobile communication network, to a server associated with the application. The request includes a network address assigned to the mobile station for the established data session, the number associated with the account of the mobile station for communications of the mobile station through the mobile communication network and the device specific identifier of the mobile station. However, the request does not include any user input at the mobile station regarding user authorization for the application service. The mobile station receives a response from the server through the mobile communication network granting access to the application service, based on a successful determination of correlation of the network address, the number and the device specific identifier of the mobile station based on data from one or more systems of the mobile communication network.

In more specific examples discussed in detail below, when a device-resident application on the mobile station is started by user, the mobile station queries the native resources within that device to get the device's current IP address, MTN (mobile telephone number) and MEID (Mobile Equipment Identifier) or ESN (electronic serial number). The mobile station includes these values in the request and sends the request for service to an application server. The application server may rely on an authentication server to query a AAA system of the network to get the MTN of the device assigned to use the IP address. The appropriate server then compares the MTN retrieved from the AAA system with the MTN passed to the server(s) by the application in the mobile station. If the MTNs match, it indicates the requesting device is a valid carrier-owned device and the identification of the MTN as received from the request is correct. To make this device identification more fool-proof, the server application (in the application server or an authentication server) then queries a network database such as DMD to find out the MEID (or ESN) associated with the MTN. The server compares the MEID (or ESN) retrieved from the network database with the MEID (or ESN) passed to the server by the device application via the request. If the device specific IDs match, the server application can safely assume a perfect authenticity of the requesting device and send any MTN-specific information in the response, effectively authorizing and/or providing access to the requested application service. Thus the exemplary methodology implements a transparent authentication of the device and identification of the associated account (e.g. based on MTN) without needing any user input of a User ID, Password or the like. The exemplary methodology thus implements a secure data access, ensures customer data privacy and improves user experience.

Other concepts relate to unique software for implementing the automatic authentication technique, either from the server perspective or from the mobile station perspective. A software product, in accord with such a concept, includes at least one machine-readable medium and information carried by the medium. The information carried by the medium may be executable program code for implementing functions similar to steps of the server method or steps of the mobile station method.

The disclosure herein also encompasses appropriately configured hardware. For example, a platform operating as the application server might be configured by programming or other means to be able to perform functions similar to steps of the server method. Similarly, a mobile station might be configured by programming or other means to be able to perform functions similar to steps of the mobile station method outlined above.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 6 is a flowchart showing events that take place during the start of a typical web application activated from a mobile station device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and equipment disclosed herein provide application services for users of mobile station devices, with enhanced automatic security related features, for determining that the mobile device is valid and authenticated and that an account number from the device is genuine, without requiring user input of a User ID, Password or the like.

In a specific example discussed in detail below, when the mobile application is started, it queries the device resources and retrieves two pieces of information from within the mobile station: an account number for the mobile station such as its MTN (mobile telephone number) or MDN (mobile directory number) and a device specific identifier such as the mobile station's MEID (Mobile Equipment Identifier) or ESN (Electronic Serial Number). The mobile application may enable the device to encrypt these two values (account number and device specific identifier). The application causes the device to send the data to the appropriate application server using HTTP protocol.

In the example, the application server at first gets the IP source address from the HTTP request header. Then, the application server queries the network AAA system with the IP address to get the corresponding account number (MTN or MDN). If the account number from the AAA matches the MTN or MDN sent by the requesting device, the match provides a confirmed proof that the device is a carrier-authorized device. It also confirms validity of the account number associated with the device. The correctness of device identification would then be confirmed through another step. The application server will query a billing system or the like using the MTN or MDN to get the corresponding device specific identifier such as the mobile station (MEID or ESN). This device identifier from the billing system would then be compared with the device identifier sent by the requesting device. If those device IDs match, it would mean that the server has a solid confirmation that the mobile device is valid and authenticated and that the account from the device is genuine.

Figure 1:
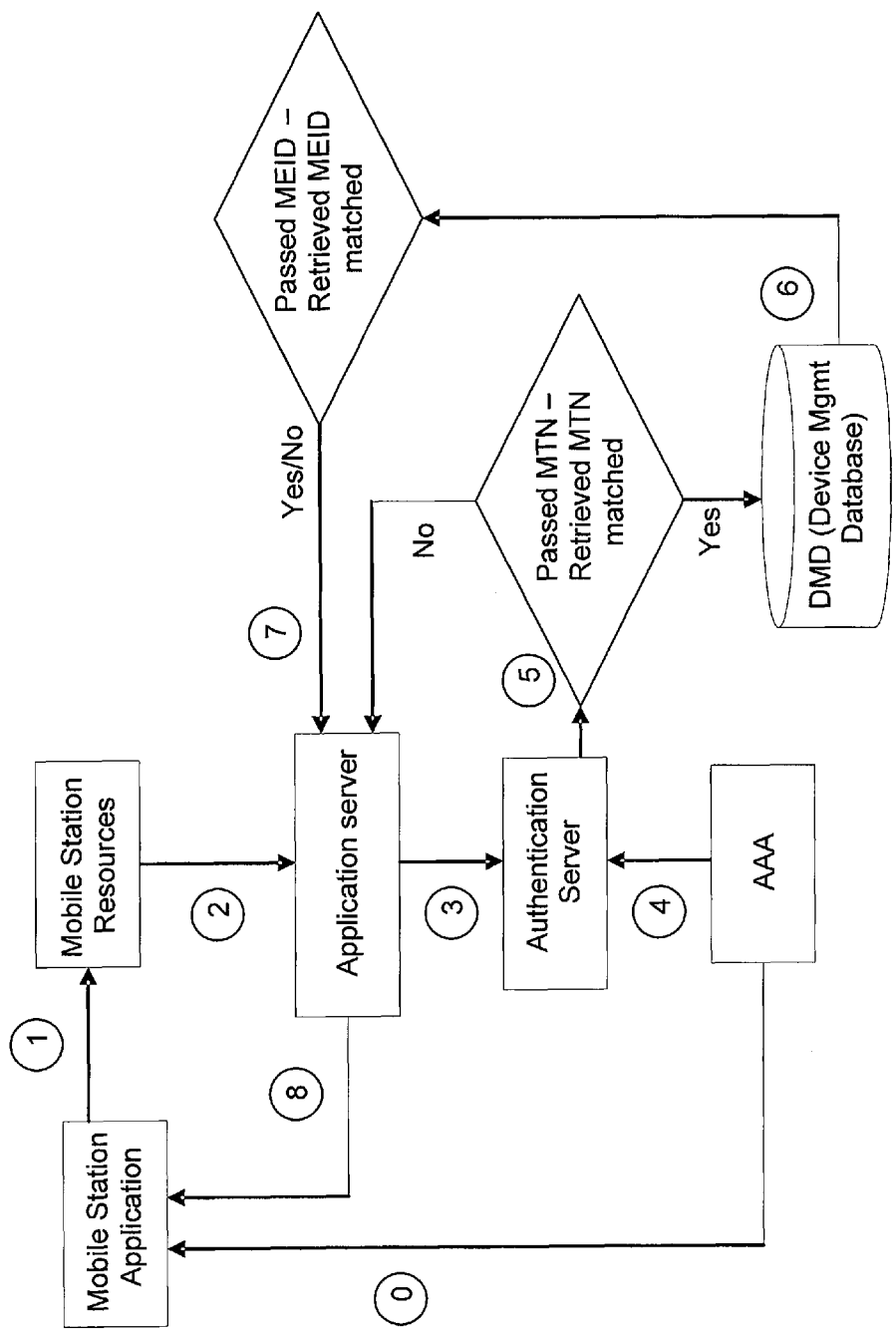
FIG. 1 is a flowchart showing events that may take place in an exemplary method while starting a typical mobile application.

With that introduction, reference now is made in detail to the specific examples illustrated in the accompanying drawings and discussed below. FIG. 1 illustrates events that may take place in an exemplary method while starting a typical mobile application. An exemplary network in which the mobile station may operate and obtain application services is described later, with regard to FIG. 2. The device referred to in the outline is typically a mobile station, an example of which will be described in more detail later with regard to FIG. 3.

Initially (step 0 in FIG. 1), the user of a mobile station operates that device to start a particular device application. In the example, an essential process must complete successfully in the background. Specifically, the device needs to setup an HTTP session authorized by the network's AAA system. As with any data communication, the mobile station communicates with a AAA system of the service provider's network, which in turn confirms identification of the device and checks with the provider's billing system to determine whether or not the device is authorized for a data session. If all results are positive, the AAA assigns an IP address to the mobile station device and updates the AAA database with the MTN and the assigned IP address. The device is now able to participate in the network and communicate with other systems. All these initial functions happen in the background at the network level, and the newly started application is not aware of those functions. This network level registration may establish the data session prior to start-up of this particular application, e.g. for an earlier selected application, or in response to start-up of the currently selected application.

In step 1, at the application level, the first thing that would happen is the application would query the device resources. That is to say, the newly started application in the mobile station would cause a processor of the station running that application to retrieve the MTN (mobile telephone number) and the MEID (Mobile Equipment Identifier) of the mobile station from storage within the device. Some old devices may have ESN (electronic serial number) instead of MEID, but both of IDs represent the same thing—a unique mobile device identifier specified by the manufacturer. It is never possible for two devices to have the same identifier and work on the network.

At step 2, execution of the application causes the mobile station to send a request to the application server using HTTP protocol. The request would contain the MTN and MEID. To prevent spoofing, the values could also be sent in an encrypted form or an HTTPS protocol could be used instead. The request message contains source and destination address fields. The destination address would be that of the server, however, the source address would be the IP address assigned to this mobile station.

In the example, the application server delegates the request-authenticating responsibility to an associated authentication server by forwarding the request to the authentication server (step 3). The authentication server could be a separate physical server or another module running on the platform that runs the server application.

At step 4, the authentication server would keep the MTN and MEID in a temporary storage and retrieve the IP address used by the mobile station from the source address field of the HTTP header of the request message. Then, the authentication server sends a query to the network's AAA system, asking for the MTN associated with the IP address.

As shown at step 5, the authentication server compares the MTN retrieved from the AAA system with the MTN passed to the server(s) in the request message initially received from the requesting mobile station. If the MTN passed from the mobile station does not match with the MTN retrieved from the AAA system, it is an indication that the device is not authenticated. This negative result would then be sent to the application server.

However, as shown at step 6, a match between the MTN passed from the mobile station and the MTN retrieved from the AAA system indicates that the mobile station device is an authenticated device and the MTN from that station is valid. This indication can be confirmed as completely error-free by doing the next step. A billing system of the network, such as a system maintaining the network's DMD (device management database), may be queried with the MTN from the request message (and now validated through the AAA), in order to get the device MEID associated with the MTN. If this MEID from the DMD matches the MEID from the message, it confirms that the mobile station is an authenticated device and that the MTN and MEID from that device are valid and correct. This conformation is sent to the application server (step 7).

At step 8 in our example, the application server has the confirmation that the mobile station is an authenticated device and that the MTN from that station is valid, therefore the application server will store this information in the session and communicate to the application. If the confirmation was negative, the application would not be allowed to go to the next step and an appropriate error message would be sent and displayed. Otherwise the application would continue and go to the next step.

The exemplary method results in one or more of the following benefits over the traditional method of user authentication: automatic identification of carrier-authorized devices, automatic verification of MDN (account ID) associated with a device, zero-input requirement for user authentication, and significantly enhanced user experience.

Figure 2:
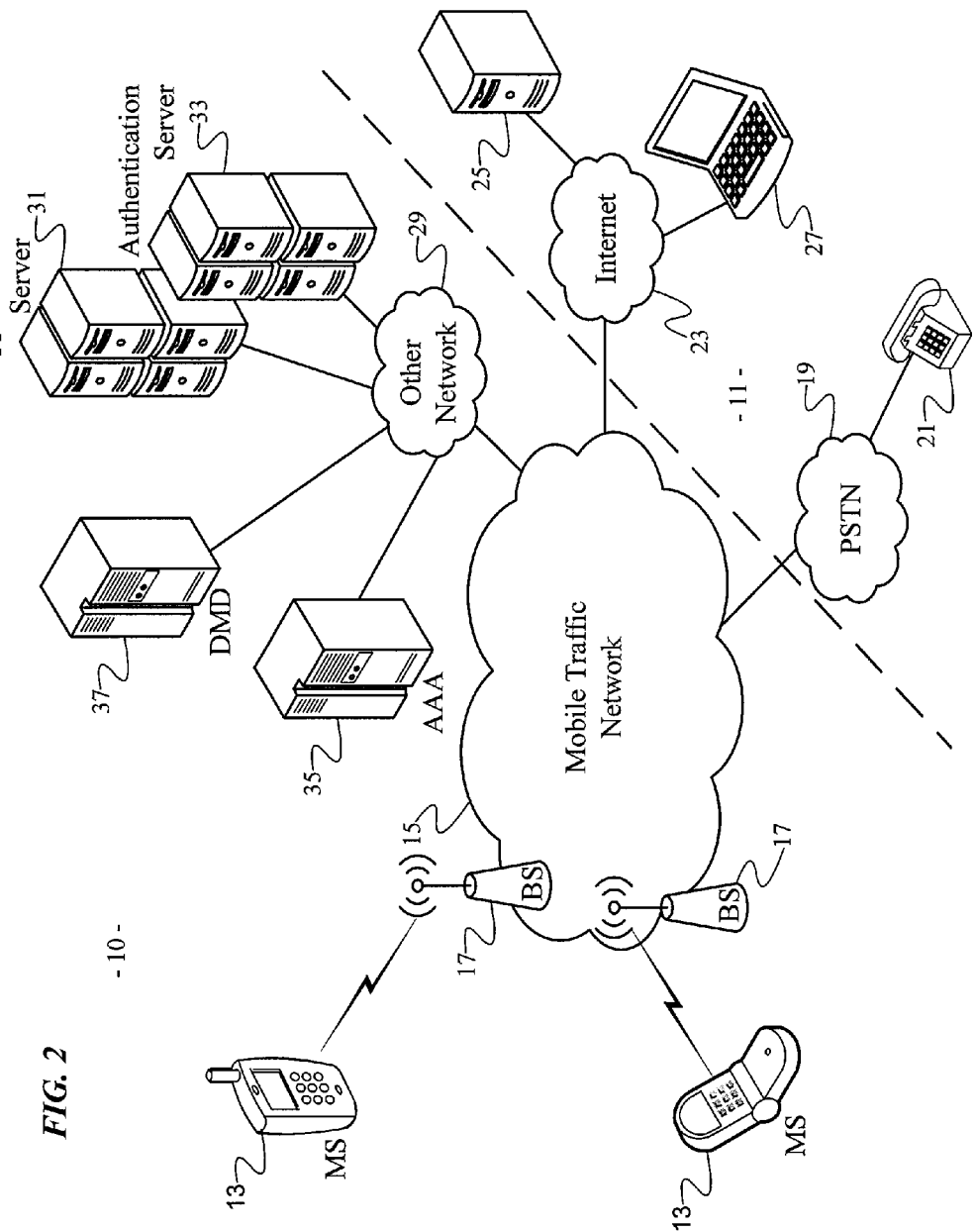
FIG. 2 is a high-level functional block diagram of an example of a system of networks/devices that provide various communications for mobile stations and support the automatic authentication of a carrier-authorized mobile device and automatic verification of an account identifier.

To appreciate the application of the above-discussed technique, it may be helpful to consider the context of an exemplary system of networks and devices offering mobile communication services, as well as the hardware and software of network equipment and mobile stations, as may be involved in providing application services with the identification and authentication technique of FIG. 1. FIG. 2 illustrates a mobile communication network 10 as may be operated by a carrier or service provider to provide a wide range of mobile communication services and ancillary services or features to its subscriber customers and associated mobile station (MS) users. FIG. 2 also illustrates several systems/elements associated with or included in the mobile network for various functions as may be involved in or take advantage of a procedure like that of FIG. 1.

The elements indicated by the reference numeral 10 generally are elements of the network and are operated by or on behalf of the carrier, although the mobile stations 13 typically are sold to the carrier's customers. The mobile communication network 10 provides communications between mobile stations 13 as well as communications for the mobile stations 13 with networks and stations 11 outside the mobile communication network 10. In the example, the application server 31 and the associated authentication server 33 are operated by the same carrier/service provider, although it is contemplated that the methods discussed herein may be applied to servers/applications of third party service providers that connect to but are otherwise independent of the network 10.

Several mobile stations 13 appear in the drawing, to represent examples of the mobile stations that may receive various services via the mobile communication network 10. Today, mobile stations typically take the form portable handsets, smart-phones or personal digital assistants, although they may be implemented in other form factors.

The network 10 allows users of the mobile stations to initiate and receive telephone calls to each other as well as through the public switched telephone network (PSTN) and telephone stations connected thereto. The network 10 allows SMS, EMS, and MMS type messaging between mobile stations and similar messaging with other devices via the Internet. The network 10 typically offers a variety of other data services via the Internet, such as downloads, web browsing, e-mail, etc.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements, such as various messaging centers for SMS, MMS or the like. A regional portion of the network 10, such as that serving mobile stations 13, will typically include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 typically comprises a base transceiver system (BTS) which communicates via an antennae system at the site of base station and over the airlink with one or more of the mobile stations 13 when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 15, which carries the user communications for the mobile stations 13 between the base stations and other elements with or through which the mobile stations communicate. Other individual elements such as switches and/or routers forming the traffic network 21 are omitted here for simplicity.

The traffic network portion 15 of the mobile communication network 10 connects to a public switched telephone network 19. This allows the network 10 to provide voice grade call connections between mobile stations and regular telephones connected to the PSTN 19. The drawing shows one such telephone at 21.

The traffic network portion 15 of the mobile communication network 10 connects to a public packet switched data communication network, such as the network commonly referred to as the "Internet" shown at 23. Packet switched communications via the traffic network 15 and the Internet 23 may support a variety of user services through the network 10, such as mobile station communications of text and multimedia messages, e-mail, web surfing or browsing, programming and media downloading, etc. For example, the mobile stations 13 may be able to receive messages from and send messages to user terminal devices, such as personal computers, either directly (peer-to-peer) or via various servers (not separately shown). The drawing shows one server 25 and one user terminal device as a personal computer (PC) at 27, by way of example.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31, a related authentication server 33 for the application service of server 31, an authentication, authorization and accounting (AAA) system 35 and a billing computer or other hardware platform implementing a device management database (DMD) 37.

A mobile station 13 communicates over the air with a base station 17 and through the traffic network 15 for various voice and data communications, e.g. with the Internet 23 and/or with application servers 31. A session for a data communication may extend to the Internet 25 or through another network 29 to an application server 31, in this example, operated by the network service provider/carrier as part of the overall network 10. The server may provide any of a variety of common application functions in support of or in addition to an application program running on the mobile station 13. For a given service, the application within the mobile station may be considered as a 'client' and the programming at 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10.

Data communications through the network 10, including those with an application server 31, require that a mobile station 13 is logged on or registered with the network 10, for packet data type communication services. To insure that the data communication service of the network 10 is available to only authorized devices/users, the network service provider/carrier also deploys a server 31 functioning as the AAA system. In our example, the mobile station 13 logs-into the network 10 for data service and obtains an IP address assignment, in the normal manner, e.g. through interaction with a packet data service node or "PDSN" (not shown) and registration through that interaction with the AAA system 35. As part of that network log-in, the mobile station 13 receives an IP address assignment from the AAA system 35. Then, the station 13 is capable of sending and/or receiving various data application communications through the network 10, e.g. for MMS messaging, for Internet browsing and/or for application services hosted on servers like the server 31 in our example.

The registration and attendant IP address assignment may have occurred earlier (as discussed above relative to step 0 in FIG. 1), but if not, then the activation of the particular client service application within the mobile station will cause the mobile station 13 to register and obtain an IP address for its use in communication regarding the application service. Stated another way, a data communication session is established/authorized through the network for the mobile station 13. Having previously established that session, the mobile station 13 uses that session to initially request access to the application service from the application server 31. Of note for purposes of our discussion, having completed such a registration procedure with a mobile station 13, the AAA system 35 stores data showing the IP address assignment to the MTN of the account for the registered mobile station 13, for the duration of the session during which the mobile station may use that IP address for any of its data communications, and/or for later accounting purposes. At least from the perspective of the AAA system, the MTN is a number of or associated with the subscriber account for the mobile station, e.g. for accounting and billing purposes. As discussed above relative to steps 3 to 5 of the process of FIG. 1, the application or authentication server 31 or 33 can query the AAA system 35 with the IP address from an application service request, and the AAA system 35 can use that address to look-up the MTN of the mobile device that has received an assignment of that IP address for its current data communication usage.

As part of its record keeping and/or to manage services provided through various devices to its customers, the carrier also operates a billing system or other computer platform that maintains various information regarding the subscriber accounts and the device or devices covered under each of those accounts. In the example, the carrier also operates a computer platform that maintains a device management database (DMD) 37. Of note for purposes of this discussion, the DMD database 37 stores data showing the correlation of MTN to a unique device identifier (MEID or ESN) for the mobile station 11 authorized by the network 10 to use a particular MTN. As discussed above relative to steps 5 and 6 of the process of FIG. 1, the application or authentication server 31 or 33 can query the DMD 37 with the validated MTN to obtain the unique device identifier (MEID or ESN) for the mobile station 13 authorized by the network 10 to use the MTN, in this case, the MTN from the original application service request from the station 13.

As shown by the above discussion, the application processing including the retrieval of information and transmission of the initial request message, is implemented in one of the mobile stations 13. Those skilled in the art presumably are familiar with the structure, programming and operations of such stations. However, for completeness, it may be useful to consider the functional elements/aspects of an exemplary mobile station, at a high-level.

Figure 3:
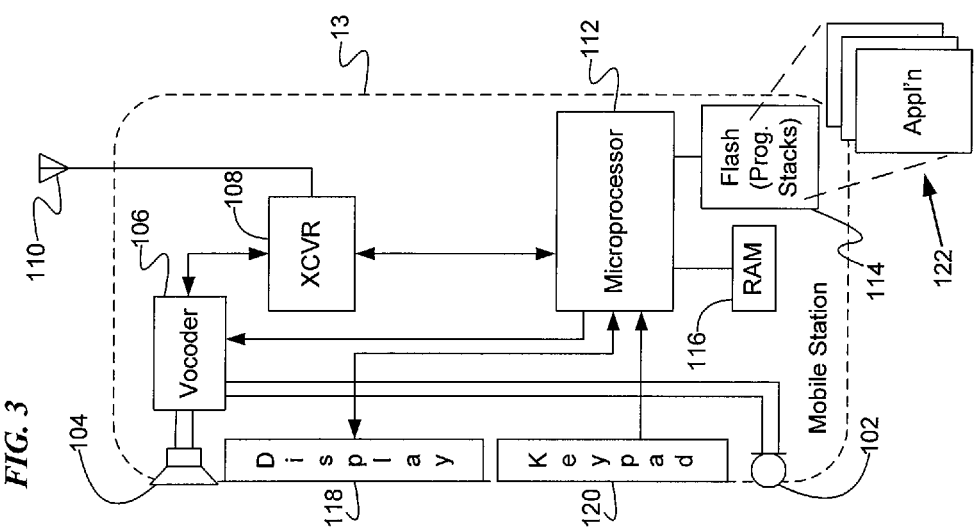
FIG. 3 is a high-level functional block diagram of an exemplary mobile station as may be used in the method of FIG. 1 when operating in a network/system like that shown in FIG. 2.

For purposes of such a discussion, FIG. 3 provides a block diagram illustration of an exemplary wireless device 13. Although the wireless device 13 may be a smart-phone or may be incorporated into another device, such as a personal digital assistant (PDA) or the like, for discussion purposes, the illustration shows the wireless device 13 in the form of a handset. The handset embodiment of the wireless device 13 functions as a normal digital wireless telephone station. For that function, the station 13 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13 also includes at least one digital transceiver (XCVR) 108. Today, the handset 13 would be configured for digital wireless communications using one or more of the common network technology types. For example, the handset 13 may be a dual mode device capable of utilizing either or both of CDMA (IS-95, 1XRTT or EV-DO) technologies and 3GPP (LTE/

GSM/UMTS) technologies. For that purpose, the transceiver (XCVR) 108 could be a multimode transceiver, or the mobile station 13 may include two or more transceivers each of which supports a subset of the various technologies or modes. The concepts discussed here encompass embodiments of the station 11 utilizing any digital transceivers that conform to current or future developed digital wireless communication standards. The mobile station 13 may also be capable of analog operation via a legacy network technology, at least for voice telephone communications.

The transceiver 108 provides two-way wireless communication of information, such as vocoded speech samples and/or digital message information, in accordance with the technology of the network 10. The transceiver 108 also sends and receives a variety of signaling messages in support of the various voice and data services provided via the station 13 and the communication network, in this case, including the messages for initial set-up of a data session through the network 10 as well as for initiation of an application session with the server 31. Each transceiver 108 connects through RF send and receive amplifiers (not separately shown) to an antenna 110. In the example, the transceiver 108 is configured for RF communication in accord with a digital wireless protocol, such as the current CDMA and 3GPP protocols.

The station 13 includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a stylus and touch sensitive display screen, as in a PDA or smart phone. In addition to normal telephone and data communication related input/output (including message input and message display functions), the user interface elements also may be used for display of menus and other information to the user and user input of selections, for example, including any needed to select a particular device application for start-up.

In the example, a microprocessor 112 serves as a programmable controller or processor for the wireless device 13, in that it controls all operations of the wireless device 13 in accord with programming that it executes, for all normal operations, and for operations involved in the authentication and identification procedure under consideration here. In the example, the wireless device 13 includes flash type program memory 114, for storage of various "software" or "firmware" program routines and mobile configuration settings, such as mobile telephone number (MTN or MDN), etc. The wireless device 13 may also include a non-volatile random access memory (RAM) 116 for a working data processing memory. The RAM, for example, may store an assigned IP address for the duration of a data registration on the network 10. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 100 includes a processor, and programming stored in the flash memory 114 configures the processor so that the mobile station is capable of performing various desired functions, including in this case the functions involved in the technique for accessing application services as well as the automatic procedures for authentication and identification with the relevant application server(s). In the example, the executable programming stored in the flash memory 114 includes a plurality of device applications 122, at least some of which involve communication with an application server that provides or supports the associated application service(s). Such an application may be selected and started-up by user selection via the GUI on the mobile station, and in response, the application will cause the processor to automatically retrieve the MEID and MTN and generate the request message for the authentication function. The application also controls processing of the response from the application server in accord with the particular service supported by the application 122 and the server 31.

The structure and operation of the mobile station 11, as outlined above relative to FIG. 3, were described to by way of example, only.

As shown by the above discussion, functions relating to the automatic device authentication and account identification with respect to an application may be implemented on computers connected for data communication via the components of a packet data network, operating as an servers 31, 33 and/or on programmable mobile stations 13, in accordance with the methodology of in FIG. 1. An exemplary mobile station device has been discussed above with respect to FIG. 3. Although special purpose devices may be used as the server (s), such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the IP address to MTN correlation by AAA 35, files used for the MTN to MEID correlation by the DMD 37 and/or for storage of the IP address, the MTN and/or the MEID in the mobile station 13. The software code is executable by the general-purpose computer that functions as the application and/or authentication server and/or by the processor of a mobile station device. In operation, the respective programming code is stored within the general-purpose computer platform for the server or within the mobile station terminal device. At other times, however, the software may be stored at other locations and/or transported for loading into the appropriate general-purpose computer system or mobile station device. Execution of server application programming by a processor of the computer platform enables the platform to implement the methodology for authorizing access to the application service, and execution of the application by the processor in the mobile station enables that device to request access and receive and process responsive application service information, in essentially the manner performed in the implementations discussed and illustrated herein.

Figure 4:
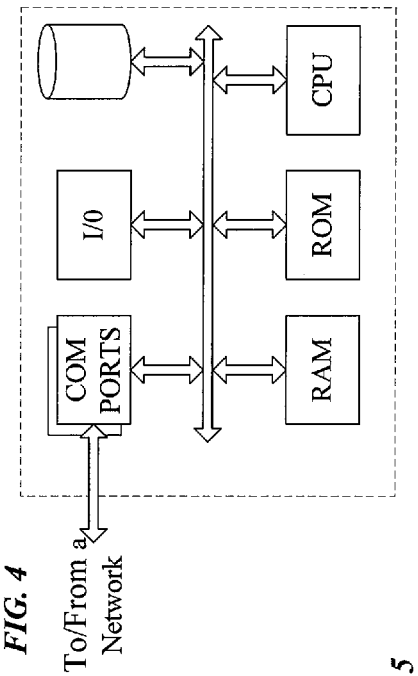
FIG. 4 is a simplified functional block diagram of a computer that may be configured as a host or server, for example, to function as the application or authentication server, or as the AAA or a platform hosting the DMD, in the system of FIG. 2.
Figure 5:
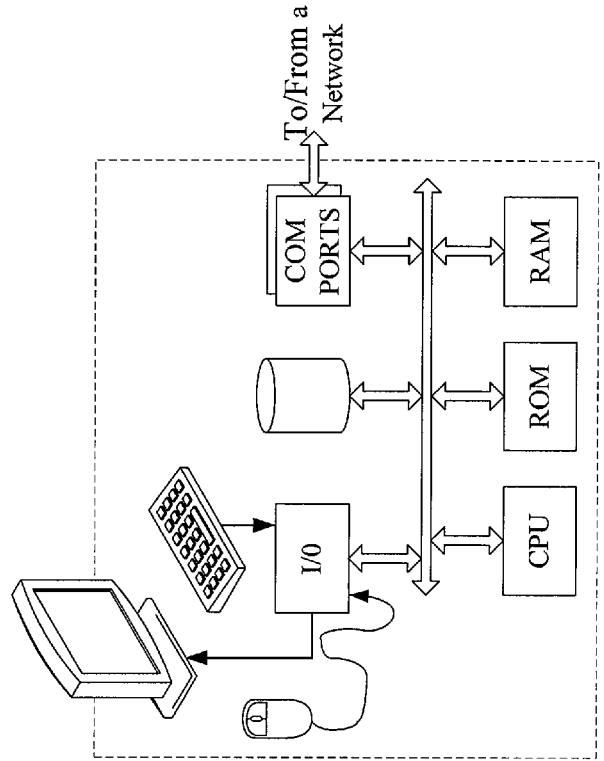
FIG. 5 is a simplified functional block diagram of a personal computer or other work station or terminal device, although that device may also be configured as a server.

FIGS. 4 and 5 provide functional block diagram illustrations of general purpose computer hardware platforms, as might be used as servers or other computers discussed in the examples above. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of automatically identifying a carrier-authorized mobile device in response to start-up of an application in the device and to automatically verify an account identifier such as a mobile number associated with the device, as outlined above, may be embodied in programming for a server and/or programming for a mobile station. Program aspects of the technology may be thought of as "products" or "articles of manufacture" typically in the form of executable code and/or associated data that is carried on or embodied in a type of machine readable medium. "Storage" type media include any or all of the tangible, non-transitory memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator into the computer platform of the application server 31 and/or the authentication server, or into one or more of the mobile stations 11. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible non-transitory storage medium, a carrier wave medium or a physical transmission medium. Non-volatile tangible non-transitory storage media include, for example, optical or magnetic disks, such as any of the storage devices in any of the mobile stations, various computers or the like, as shown in the drawings. Volatile tangible non-transitory storage media include dynamic memory, such as main memory of such a computer platform or mobile station. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of machine-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM, EPROM and EEPROM, a Flash-EPROM, any other memory chip or cartridge, a carrier wave transporting data or instructions, cables or links transporting such a carrier wave, or any other medium from which a computer can read programming code and/or data. Many of these forms of computer or machine readable media may be involved in carrying one or more sequences of one or more instructions to a processor for execution.

Those skilled in the art will appreciate that the concepts described above may be modified in a variety of ways. For example, the order and data for the queries to network systems like AAA and DMD can be varied. For example, the query to DMD might provide MEID and ask for MTN. As another example, the server(s) might query DMD before the query to the AAA.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

1XRTT—one (1) times (x) radio transmission technology
3GPP—third (3) generation partnership project
AAA—Authentication, Authorization and Accounting
BS—Base Station
BTS—Base Transceiver System
CD—Compact Disk
CDMA—Code Division Multiple Access
CD-ROM—Compact Disk-Read Only Memory
DMD—Device Management Database
DVD—Digital Versatile (or Video) Disk
DVD-ROM—Digital Versatile (or Video) Disk-Read Only Memory EEPROM—Electrically Erasable Programmable Read Only Memory
EMS—Enhanced Messaging Service
EPROM—Erasable Programmable Read Only Memory
ESN—Electronic Serial Number
EV-DO—EVolution-Data Optimized
GSM—Global System for Mobile communications
GUI—Graphical User Interface
HTTP—Hypertext Transfer Protocol
HTTPS—Hypertext Transfer Protocol Secure
IR—Infrared
IS-95—Interim Standard 95
LTE—Long-Term Evolution
MEID—Mobile Equipment Identifier
MS—Mobile Station
MMS—Multimedia Messaging Service
MTN—Mobile Telephone Number
MDN—Mobile Dialing Number
PC—Personal Computer
PDA—Personal Digital Assistant
PDSN—Packet Data Service Node
PROM—Programmable Read Only Memory
PSTN—Public Switched Telephone Network
RAM—Random Access Memory
RAN—Radio Access Network
RF—Radio Frequency
ROM—Read Only Memory
SMS—Short Messaging Service
UMTS—Universal Mobile Telecommunications System
WAN—Wide Area Network
XCVR—Transceiver

What is claimed is:

1. A method of authorizing mobile access to an application service, comprising steps of:
    receiving in an application server for providing the application service, from a mobile station via a data session for the mobile station previously established through a mobile communication network, a request for the application service related to an application started on the mobile station, wherein:
        the request includes a network address assigned to the mobile station for the established data session, a number associated with an account of the mobile station for communications of the mobile station through the mobile communication network, and a device specific identifier of the mobile station, but
        the request does not include any user input at the mobile station regarding user authorization for the application service;
    sending a query containing the network address assigned to the mobile station for the established data session, from the application server to an authentication element of the mobile communication network;
    receiving a response to the query from the authentication element, the response from the authentication element containing an account associated number to which the network address has been assigned;
    sending another query from the application server to a database of the mobile communication network, the other query including the number contained in the request received from the mobile station;
    receiving a response to the other query, from the database of the mobile communication network, the response from the database containing a device specific identifier associated with the number contained in the request; and
    authorizing, in the application server, the mobile station to access the application service responsive to:
        (a) a match of the number contained in the request received from the mobile station with the account associated number received in the response from the authentication element, and
        (b) a match of the device specific identifier contained in the request received from the mobile station with the device specific identifier contained in the response from the database.

2. The method of claim 1, wherein at least the number associated with the account of the mobile station and the device specific identifier of the mobile station contained in the request are encrypted.

3. The method of claim 1, wherein the number associated with the account of the mobile station contained in the request is a mobile telephone number (MTN) or a mobile directory number (MDN) assigned to the mobile station by a carrier operating the network for communications of the mobile station through the mobile communication network.

4. The method of claim 3, wherein the device specific identifier of the mobile station contained in the request is a Mobile Equipment Identifier (MEID) or an Electronic Serial Number (ESN) of the mobile station.

5. The method of claim 1, wherein:
    the authentication element is an authentication, authorization and accounting (AAA) system of the mobile communication network, and
    the database is a device management database (DMD) of the mobile communication network.

6. The method of claim 5, wherein:
    the number associated with the account of the mobile station contained in the request is a mobile telephone number (MTN) assigned to the mobile station by a carrier operating the network for communications of the mobile station through the mobile communication network, and
    the device specific identifier of the mobile station contained in the request is a Mobile Equipment Identifier (MEID) of the mobile station.

7. An article comprising a non-transitory machine readable storage medium having programming encoded thereon for making one or more server platforms perform the steps of the method of claim 1.

8. A server platform, comprising:
    an interface for communications with a mobile communication network;
    a processor coupled to the interface;
    a memory accessible by the processor; and
    programming stored in the memory and executable by the processor, wherein the programming configures the processor to give the server platform functional capabilities to:
    receive in the server platform for providing an application service, from a mobile station via a data session for the mobile station previously established through the mobile communication network, a request for the application service related to an application started on the mobile station, wherein:
        the request includes a network address assigned to the mobile station for the established data session, a number associated with an account of the mobile station for communications of the mobile station through the mobile communication network and a device specific identifier of the mobile station, but
        the request does not include any user input at the mobile station regarding user authorization for the application service;
    send a query containing the network address assigned to the mobile station for the established data session, from the server platform to an authentication element of the mobile communication network;

receive a response to the query from the authentication element, the response from the authentication element containing an account associated number to which the network address has been assigned;

send another query from the server platform to a database of the mobile communication network, the other query including the number contained in the request received from the mobile station;

receive a response to the other query, from the database of the mobile communication network, the response from the database containing a device specific identifier associated with the number contained in the request; and authorize, by the server platform, the mobile station to access the application service responsive to:
(a) a match of the number contained in the request received from the mobile station with the account associated number received in the response from the authentication element, and
(b) a match of the device specific identifier contained in the request received from the mobile station with the device specific identifier contained in the response from the database.

9. A method of authorizing mobile access to an application service, comprising steps of:

receiving in an application server for providing the application service, from a mobile station via a data session for the mobile station previously established through a mobile communication network, a request for the application service related to an application started on the mobile station, wherein:

the request includes a network address assigned to the mobile station for the established data session, a number associated with an account of the mobile station for communications of the mobile station through the mobile communication network and a device specific identifier of the mobile station, but the request does not include any user input at the mobile station regarding user authorization for the application service;

sending a first query containing the network address assigned to the mobile station for the established data session, from the application server to an authentication element of the mobile communication network;

receiving a response to the first query from the authentication element, the response to the first query containing an account associated number to which the network address has been assigned;

responsive to a match of the account associated number received in the response to the first query with the number contained in the request received from the mobile station, sending a second query from the application server to a database of the mobile communication network, the second query including the number contained in the request received from the mobile station;

receiving a response to the second query, from the database of the mobile communication network, the response to the second query containing a device specific identifier associated with the number contained in the request received from the mobile station; and authorizing, in the application server, the mobile station to access the application service upon a match of the device specific identifier contained in the request received from the mobile station with the device specific identifier contained in the response to the second query.

10. A server platform, comprising:

an interface for communications with a mobile communication network;

a processor coupled to the interface;

a memory accessible by the processor; and programming stored in the memory and executable by the processor, wherein the programming configures the processor to give the server platform functional capabilities to:

receive in the server platform for providing an application service, from a mobile station via a data session for the mobile station previously established through the mobile communication network, a request for the application service related to an application started on the mobile station, wherein:

the request includes a network address assigned to the mobile station for the established data session, a number associated with an account of the mobile station for communications of the mobile station through the mobile communication network and a device specific identifier of the mobile station, but the request does not include any user input at the mobile station regarding user authorization for the application service;

send a first query containing the network address assigned to the mobile station for the established data session, from the server platform to an authentication element of the mobile communication network;

receive a response to the first query from the authentication element, the response to the first query containing an account associated number to which the network address has been assigned;

responsive to a match of the account associated number received in the response to the first query with the number contained in the request received from the mobile station, send a second query from the server platform to a database of the mobile communication network, the second query including the number contained in the request received from the mobile station;

receive a response to the second query, from the database of the mobile communication network, the response to the second query containing a device specific identifier associated with the number contained in the request received from the mobile station; and authorize, by the server platform, the mobile station to access the application service upon a match of the device specific identifier contained in the request received from the mobile station with the device specific identifier contained in the response to the second query.

* * * * *